Jan. 13, 1942.  A. S. VOLPIN  2,269,886
LUBRICATION SYSTEM FOR PLUG VALVES
Filed Feb. 9, 1940
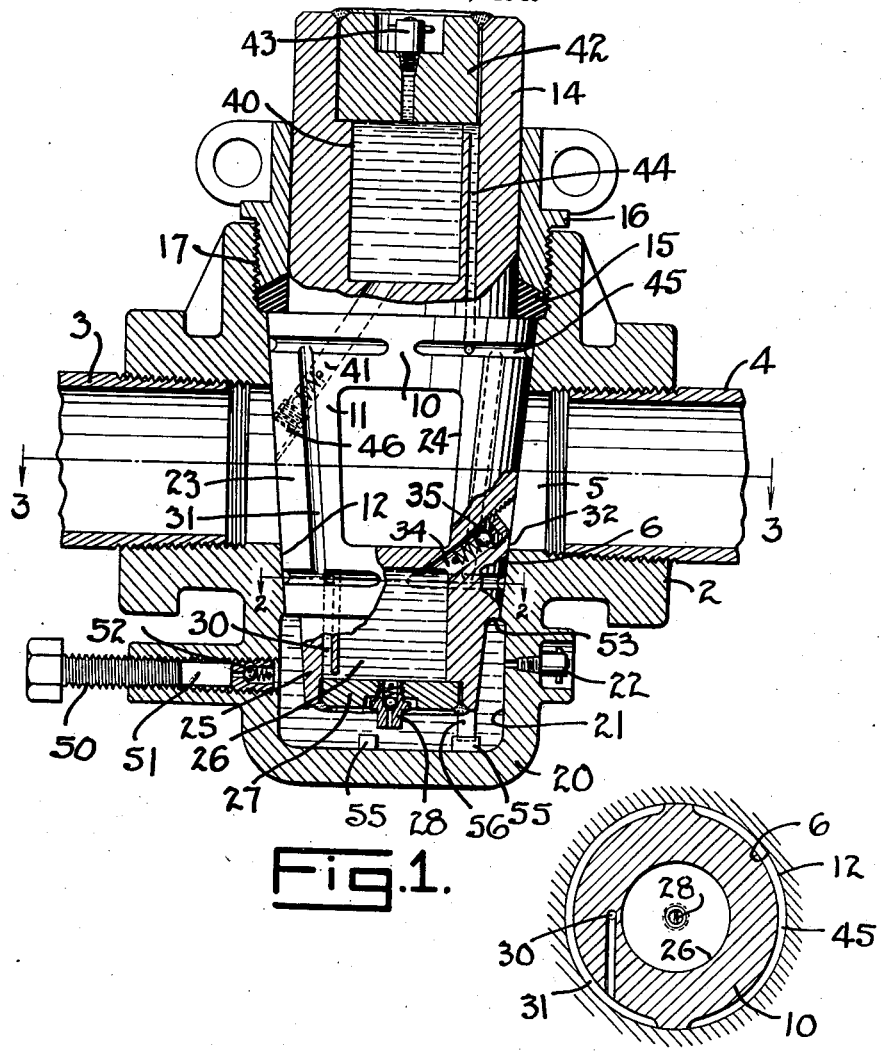
Fig.1.
Fig.2.
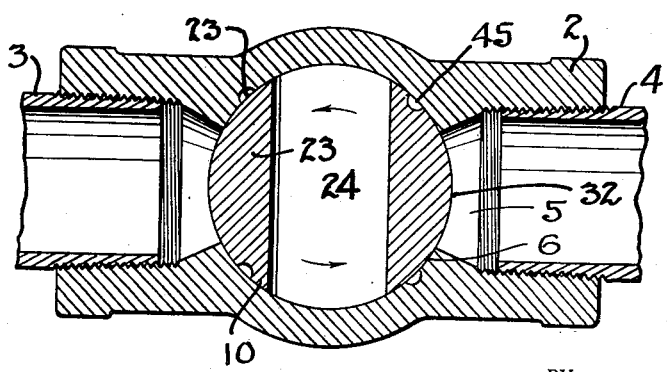
Fig.3.
A. S. VOLPIN
INVENTOR.
Jesse R Stone
Lester B Clark
ATTORNEYS Patented Jan. 13, 1942

2,269,886

UNITED STATES PATENT OFFICE 2,269,886

LUBRICATION SYSTEM FOR PLUG VALVES

Alexander S. Volpin, Houston, Tex., assignor to Mission Manufacturing Company, Houston, Tex.

Application February 9, 1940, Serial No. 318,030

14 Claims. (Cl. 251—93)

The invention relates to a system of lubrication for plug valves wherein the pressure being closed off by the valve is utilized to apply and maintain a seal on the low pressure side to prevent leakage.

The valve is of the type which can be utilized in a pipe line and may be turned as desired, regardless of which direction the flow may be in the pipe line, as distinguished from some types of valves wherein the valve must be correctly positioned in the lines because the high pressure can be applied to only one side thereof.

It is one of the objects of the invention to utilize the high pressure by applying it to a reservoir in order to force lubricant into sealing position on the opposite side of the valve.

Another object of the invention is to provide a dual lubrication system for valves wherein the high pressure may be introduced into the plug from either side and applied to a reservoir so as to force lubricant to the opposite side of the valve.

Still another object of the invention is to provide a valve member for plug valves wherein there are a plurality of lubricant reservoirs.

Still another object of the invention is to apply a hydraulic pressure in unseating the valve and effecting operation thereof.

Still another object of the invention is to provide a passage from one side of the valve to a lubricant reservoir and from the lubricant reservoir to a distributing groove so as to maintain a seal about the low pressure outlet of a plug valve.

Other and further objects of the invention will be readily apparent when the following description is considered in connection with the accompanying drawing wherein:

Fig. 1 is a vertical section showing parts of the plug in elevation and illustrating the general arrangement of the structure.

Fig. 2 is a section taken on the line 2—2 of Fig. 1.

Fig. 3 is a transverse sectional view on the line 3—3 of Fig. 1.

The valve housing is indicated generally at 2 and has the pipe lines 3 and 4 connected thereto. A transverse passage 5 extends through the housing and intersects the valve chamber 6 which extends at right angles thereto. This chamber is shown as tapered but it may be cylindrical if desired. A plug valve 10 has been positioned in the chamber and has a peripheral surface 11 which is arranged to engage with the seating surface 12 of the valve chamber 6. Attention is directed to the fact that the stem portion 14 of the plug member is of considerable diameter and extends upwardly through the housing. The valve plug 10 is held in position by a packing 15, which is confined by a gland 16 threaded into the neck portion 17 of the housing.

The base 20 of the valve housing is enlarged and is formed with a chamber 21 which is arranged to receive lubricant or plastic by means of a pressure receiving fitting 22. The plug 10 is of peculiar construction in that it is made up of the body portion 23 which has the transverse passage 24 therethrough. This passage is arranged to be moved into alignment with the passage 5 in the valve housing, when the valve is open, and to be moved transversely of such passage when the valve is closed, as best seen in Fig. 3.

The body 23 has an extension or skirt 25 thereon which extends downwardly into the chamber 21. This skirt is hollow to form a reservoir 26, which may be closed by a base plate 27. The plate 27 carries the one-way check valve 28 so that lubricant or plastic forced into the chamber 21 will move through the valve 28 after the chamber 21 is filled. In this manner the reservoir 26 may be filled with lubricant.

An outlet passage 30 extends vertically upward in the skirt portion 25 and joints the distributing or sealing grooves 31 which may be of any desired configuration in order to form a seal about the port 32 formed by the passage 5 on the lefthand side. With this construction lubricant may be forced into the valve through the fitting 22 and into the distributing grooves 31 to form a seal.

It is, of course, desirable to maintain a seal with this lubricant and for this purpose the body 23 has been provided with an inlet passage 34 which is seen on the righthand side of Fig. 1 as leading downwardly and inwardly from the port 32 into the top of the lubricant reservoir 26. Thus if the pipe 4 were the high pressure side of the valve then this high pressure would be exerted through this inlet opening 34 into the pressure reservoir and force the liquid to move upwardly through the passage 30 into the grooves 31. In this manner the line pressure is automatically utilized to maintain the lubricant seal. A check valve 35 in the inlet 34 prevents the escape of lubricant upwardly through this inlet.

With the foregoing construction if the pipe 4 is the high pressure pipe then the high pressure in this pipe will be utilized to maintain a seal on the downstream side of the valve which is the left hand side as viewed in the figure.

In event the pipe 3 is the high pressure side and the pipe 4 the low pressure side, then a reservoir 40 in the upper or stem portion 14 of the valve will be utilized to provide lubricant to maintain a seal about the port 32 on the right-hand or what would now be the downstream side of the valve. An inlet passage 41, which is similar to the passage 34, extends from the exposed face of the plug member 23 when the valve is closed into the base of the reservoir 40, so that lubricant introduced into this reservoir through the pressure fitting 43, carried by the closure cap 42, would be moved upwardly by such pressure and forced through the discharge passage 44 into the distributing grooves 45, which are similar to the grooves 31 in that they are arranged to form a seal about the port 32.

In this manner an automatic seal is maintained by the line pressure applied to the valve regardless of which way the valve is inserted in the pipe line and regardless of which way the flow may occur in the line. High pressure can be applied to either side of the valve and still automatically maintain a pressure seal. A check valve 46 similar to the valve 35 prevents reverse flow through the passage 41.

A screw 50 arranged to move into the recess 51 may be utilized to apply a hydraulic pressure through the check valve 52 to the chamber 21. This pressure is applied to of course the entire area of the base of the plug member which includes the area of the base plate 27 as well as the exposed shoulder 53 of the valve member. If the valve should become corroded or incapable of operation the screw 50 may be operated as a hydraulic jack so as to apply any desired pressure to unseat the valve plug.

The stop members 55 are spaced about the base of the chamber 21 in order to receive the finger 56 on the plug member so as to limit the turning movement if desired.

Broadly the invention contemplates an automatically operable plug valve to which the high pressure may be applied in any direction and wherein the seal will be automatically maintained.

What is claimed is:

1. A lubricated plug valve of the character described comprising a housing, a valve plug therein, a passage through said plug, a lubricant distributing system for the plug at each side of the passage, each system including a reservoir in the plug, a distributing groove, a connection from the one face of the plug to the reservoir to lead the line pressure into the reservoir, and a connection from the reservoir to the distributing groove on the opposite face of the plug so that the pressure on the high pressure side of the plug will force lubricant into the distributing groove on the low pressure side of the plug to maintain a seal.

2. A lubricated plug valve of the character described comprising a housing, a valve plug therein, a passage through said plug, a lubricant distributing system for the plug at each side of the passage, each system including a reservoir in the plug, a distributing groove, a connection from the one face of the plug to the reservoir to lead the line pressure into the reservoir a connection from the reservoir to the distributing groove on the opposite face of the plug so that the pressure on the high pressure side of the plug will force lubricant into the distributing groove on the low pressure side of the plug to maintain a seal, and means to introduce lubricant into each reservoir.

3. A lubricated plug valve of the character described comprising a housing, a valve plug therein, a passage through said plug, a lubricant distributing system for the plug at each side of the passage, each system including a reservoir in the plug, a distributing groove, a connection from the one face of the plug to the reservoir to lead the line pressure into the reservoir, and a connection from the reservoir to the distributing groove on the opposite face of the plug so that the pressure on the high pressure side of the plug will force lubricant into the distributing groove on the low pressure side of the plug to maintain a seal, said reservoirs being in the top and bottom of said plug.

4. A lubricated plug valve of the character described comprising a housing, a valve plug therein, a passage through said plug, a lubricant distributing system for the plug at each side of the passage, each system including a reservoir in the plug, a distributing groove, a connection from the one face of the plug to the reservoir to lead the line pressure into the reservoir, a connection from the reservoir to the distributing groove on the opposite face of the plug so that the pressure on the high pressure side of the plug will force lubricant into the distributing groove on the low pressure side of the plug to maintain a seal, and a baffle in each reservoir to cause discharge of lubricant by the entering pressure.

5. A lubricated plug valve including a housing, a plug chamber therein, opposed ports at each side of said chamber, a plug in said chamber, an independent lubrication distributing system for each of said ports when the plug is in closed position, each system including a reservoir for lubricant, an inlet to the reservoir from one side of the valve to apply pressure from that side of the valve to the lubricant, and a discharge outlet from the reservoir to the other side of the valve.

6. A lubricated plug valve including a housing, a plug chamber therein, opposed ports at each side of said chamber, a plug in said chamber, an independent lubrication distributing system for each of said ports when the plug is in closed position, each system including a reservoir for lubricant, an inlet to the reservoir from one side of the valve to apply pressure from that side of the valve to the lubricant, a discharge outlet from the reservoir to the other side of the valve, and distribution grooves about the port connected to said discharge outlet.

7. A two way lubricated plug valve having a dual lubricating system to operate automatically by the high pressure on the upstream side to lubricate and seal the low pressure or downstream side, each system including a reservoir for lubricant, an inlet thereto for the admission of pressure from one side of the valve, an outlet therefrom to the other side of the valve, and means to distribute the lubricant from said outlet about the line passage through the valve housing when the valve plug is closed.

8. A two way lubricated plug valve having a dual lubricating system to operate automatically by the high pressure on the upstream side to lubricate and seal the low pressure or downstream side, each system including a reservoir for lubricant, an inlet thereto from one side of the valve, an outlet therefrom to the other side of the valve, means to distribute the lubricant from said outlet about the line passage through the valve housing when the valve plug is closed, and additional means to apply hydraulic pressure to unseat the valve plug.

9. A plug member for lubricated plug valves including a body, a transverse passage therethrough forming two opposed curved side faces, a closed reservoir in the top of said plug, an inlet from one side face through the plug to one end of said reservoir and an outlet from the other end of said reservoir through the plug to the other side face so as to distribute lubricant to the downstream side by the pressure of the upstream side.

10. A plug member for lubricated plug valves including a body, a transverse passage therethrough forming two opposed curved side faces, a closed reservoir in the bottom of said plug, an inlet from one side face through the plug to one end of said reservoir and an outlet from the other end of said reservoir through the plug to the other side face so as to distribute lubricant to the downstream side by the pressure of the upstream side, and means at the discharge end to refill said reservoir.

11. A plug member for lubricated plug valves including a body, a transverse passage therethrough forming two opposed curved side faces, a reservoir in each the top and the bottom of said plug, an inlet from each one of said side faces to one of said reservoirs and an outlet from each of one of said reservoirs to the side face opposite its inlet so as to distribute lubricant to the downstream side by the pressure of the upstream side regardless of which side of the plug faces the upstream pressure.

12. A plug valve including a housing, a plug member, means to lubricate the downstream side of the plug by using the pressure from the high pressure side of the valve which includes a pair of reservoirs, a passage to introduce pressure from one side of the member to one reservoir and another passage from that reservoir to the opposite side of the member whereby the high pressure on one side forces lubricant from the reservoir to the other side, said means also including a reverse set of inlet and outlet passages for the other reservoir so that the valve may be reversed and the reverse side lubricated when high pressure is applied to either side of the valve.

13. A plug valve including a housing, a plug member, means to lubricate the downstream side of the plug by using the pressure from the high pressure side of the valve which includes a pair of reservoirs, a passage to introduce pressure from one side of the member to one reservoir and another passage from that reservoir to the opposite side of the member whereby the high pressure on one side forces lubricant from the reservoir to the other side, said means also including a reverse set of inlet and outlet passages for the other reservoir so that the high pressure may be applied to either side of the valve, and means to prevent reversal of the flow of lubricant from the distributing side through said reservoir.

14. A plug for a plug valve including a body, a closed reservoir for lubricant therein, means to bring the line pressure on one side of the plug when closed into one end of said reservoir, means also entirely in said plug to conduct lubricant from the other end of said reservoir to the other side of said plug, and means at said other end of said reservoir to supply additional lubricant thereto.

ALEXANDER S. VOLPIN.